(12) United States Patent
Wang

(10) Patent No.: US 11,924,256 B2
(45) Date of Patent: Mar. 5, 2024

(54) CONFERENCE CONTROL METHOD, SERVER AND COMPUTER STORAGE MEDIUM

(71) Applicant: ZTE Corporation, Shenzhen (CN)

(72) Inventor: Zhou Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/778,126

(22) PCT Filed: Nov. 25, 2020

(86) PCT No.: PCT/CN2020/131505
§ 371 (c)(1),
(2) Date: May 19, 2022

(87) PCT Pub. No.: WO2021/104307
PCT Pub. Date: Jun. 3, 2021

(65) Prior Publication Data
US 2022/0353310 A1    Nov. 3, 2022

(30) Foreign Application Priority Data

Nov. 27, 2019 (CN) .......................... 201911184771.X

(51) Int. Cl.
*H04L 65/401* (2022.01)
*H04L 65/403* (2022.01)

(52) U.S. Cl.
CPC ........ *H04L 65/4015* (2013.01); *H04L 65/403* (2013.01)

(58) Field of Classification Search
CPC .......................... H04L 65/4015; H04L 65/403

USPC ........................................................ 709/204
See application file for complete search history.

(56) References Cited

U.S. PATENT DOCUMENTS

| | | | |
|---|---|---|---|
| 2012/0066307 A1 | | 3/2012 | Raniere et al. |
| 2018/0027031 A1 | | 1/2018 | Kodaira |

FOREIGN PATENT DOCUMENTS

| | | | |
|---|---|---|---|
| CN | 101808220 A | | 8/2010 |
| CN | 103227771 A | | 7/2013 |
| CN | 203193784 U | | 9/2013 |
| CN | 104363409 A | | 2/2015 |
| CN | 104601930 A | * | 5/2015 |
| CN | 104601930 A | | 5/2015 |
| CN | 109788229 A | * | 5/2019 |
| CN | 109788229 A | | 5/2019 |

(Continued)

OTHER PUBLICATIONS

International Searching Authority. International Search Report and Written Opinion for PCT Application. PCT/CN2020/131505, dated Feb. 20, 2021, pp. 1-11.

(Continued)

*Primary Examiner* — Glenford J Madamba
(74) *Attorney, Agent, or Firm* — Vivacqua Crane, PLLC

(57) ABSTRACT

A conference control method may include: creating video conferences and data conferences both of which are in one-to-one correspondence; and receiving a control instruction sent by a conference terminal, and instructing, according to the control instruction, all conference terminals to switch to a video conference or data conference corresponding to the control instruction.

14 Claims, 1 Drawing Sheet

(56) References Cited

FOREIGN PATENT DOCUMENTS

EP         3110140 A1    12/2016
EP         3163869 A1 *   5/2017   ......... H04L 65/1083

OTHER PUBLICATIONS

European Patent Office. Extended European Search Report for EP Application No. 20893682.3, dated Nov. 4, 2022, pp. 1-10.

* cited by examiner

CONFERENCE CONTROL METHOD, SERVER AND COMPUTER STORAGE MEDIUM

CROSS-REFERENCE TO RELATED APPLICATION

This application is national stage filing under 35 U.S.C. § 371 of international application number PCT/CN2020/131505, filed Nov. 25, 2020, which claims priority to the Chinese patent application No. 201911184771.X filed on Nov. 27, 2019. The contents of these applications are incorporated herein by reference in their entirety.

TECHNICAL FIELD

Embodiments of the present disclosure relate to, but not limited to, the technical field of communication, and in particular, to a conference control method, a server and a computer storage medium

BACKGROUND

A video conference mainly realizes remote face-to-face communication through voice and images. A video conference system is sometimes called video conferencing, also known as video conferencing system, which includes a software video conference system and a hardware video conference system. The video conference system is a system device that allows two or more individuals or groups in different places to distribute static and dynamic images of a person, voice, text, pictures and other information to computers of respective users through various existing electrical communication transmission media to realize instant and interactive communication, such that users geographically dispersed can gather together to exchange information in various ways, such as graphics and sound, to enhance their understanding of the content and achieve the purpose of conferencing.

A data conference takes data exchange as the core and realizes real-time remote document and information exchange through computers. Forms of data collaboration that the data conference may provide include: application sharing, which allows one conference participant to share a program running on one computer with other conference participants who can edit and control the program in turn without installing an application on their own computers; file transfer, which allows one conference participant to send a file to several or all the conference participants, where file transfer may be performed in the background, and the conference participants can concurrently perform other data conference services such as application sharing, electronic whiteboard, and remote chat; electronic whiteboard, which is a multi-page, multi-user drawing application that allows conference participants to draw sketches or organization charts with other conference participants by clicking and dragging; and remote chat, which allows conference participants to enter text messages to communicate with other conference participants.

At present, in some cases, video conferences and data conferences in cloud conferencing systems are two relatively independent systems. In the video conferences, the data conferences of all participating terminals cannot be pulled up synchronously, and all access terminals are required to be manually triggered to enter the data conferences.

SUMMARY

According to some embodiments of the present disclosure, a conference control method is provided, including: creating video conferences and data conferences both of which are in one-to-one correspondence; and receiving a control instruction sent by a conference terminal, and instructing, according to the control instruction, all conference terminals to switch to a video conference or data conference corresponding to the control instruction.

According to some embodiments of the present disclosure, a server is further provided, including a processor, a memory and a communication bus. The communication bus is configured to realize connection communication between the processor and the memory. The processor is configured to execute one or more programs stored in the memory to carry out the conference control method as described above.

According to some embodiments of the present disclosure, a computer-readable storage medium is further provided, storing one or more computer programs executable by one or more processors, which when executed by one or more processors, cause the one or more processors to carry out the conference control method as described above.

Other features and corresponding beneficial effects of the present disclosure will be set forth in part in the description which follows, and it is to be understood that at least part of the beneficial effects will become apparent from the records in the description of the present disclosure.

DETAILED DESCRIPTION

In order to make objects, technical schemes and advantages of the present disclosure clearer, embodiments of the present disclosure are described in further detail below with reference to specific implementations in conjunction with the drawings. It is to be understood that specific embodiments described herein are intended only to illustrate and not to limit the present disclosure.

Embodiment One

Figure 1:
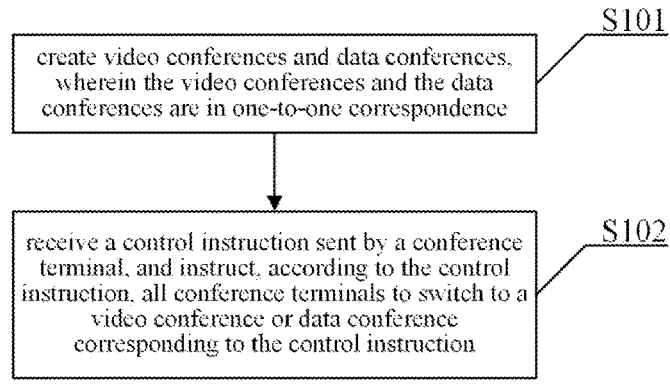
FIG. 1 is a basic schematic flowchart of a conference control method according to Embodiment one of the present disclosure.

Referring to FIG. 1, a conference control method provided by the present disclosure includes steps as follow.

At S101, video conferences and data conferences are created. The video conferences and the data conferences are in one-to-one correspondence.

In the embodiment, in order to enable participation in video conferences as well as synchronous participation in corresponding data conferences, the video conferences and the data conferences are in one-to-one correspondence. The step of creating video conferences and data conferences in such way that the video conferences and the data conferences are in one-to-one correspondence includes: creating the video conferences, and creating the data conferences according to the created video conferences, so that conference IDs of the video conferences are in one-to-one correspondence to conference IDs of the data conferences.

It is to be understood that the conference IDs of the video conferences are in one-to-one correspondence to the conference IDs of the data conferences in, but not limited to, the following two manners.

In a first manner, the conference IDs of the data conferences are calculated according to the conference IDs of the video conferences, so that the conference IDs of the video conferences are in one-to-one correspondence to the conference IDs of the data conferences.

In a second manner, the conference IDs of the data conferences are created according to the conference IDs of the video conferences, so that the conference IDs of the video conferences are the same as the conference IDs of the data conferences.

In the first manner, for example, when a video conference with a conference ID of "123456" is created, the conference ID of the video conference is inverted to obtain a conference ID "654321" for a data conference, so that the conference ID of the video conference corresponds to the conference ID of the data conference. In the second manner, when a video conference with a conference ID of "123456" is created, a data conference is created utilizing the conference ID of the video conference, so that the data conference also has a conference ID of "123456", and the conference ID of the video conference is the same as and corresponds to the conference ID of the data conference. It is to be understood that the conference IDs of the video conferences are in one-to-one correspondence to the conference IDs of the data conferences, so that conference terminals, when joining the video conferences, can obtain the conference IDs of the data conferences according to the conference IDs of the video conferences joined, and then synchronously join the data conferences corresponding to the video conferences according to the obtained conference IDs of the data conferences. Alternatively, the conference terminals, when joining the data conferences, can obtain the conference IDs of the video conferences according to the conference IDs of the data conferences, and then synchronously join the video conferences corresponding to the data conferences according to the obtained conference IDs of the video conferences.

It is to be understood that, in some examples, the conference IDs of the video conferences and the conference IDs of the data conferences are created separately, and after the creation, the created conference IDs of the video conferences are bound to the created conference IDs of the data conferences. The conference ID of one video conference can correspond to only the conference ID of one data conference. Conversely, the conference ID of one data conference can also correspond to only the conference ID of one video conference. Therefore, when joining a video conference, conference terminals may obtain a conference ID of a data conference according to a conference ID of the video conference joined, and then synchronously join the data conference corresponding to the video conference according to the obtained conference ID of the data conference.

It is to be understood that, in order to better facilitate a server to synchronously control clients joining the video conference and the data conference, user IDs of conference terminals joining the video conference are in one-to-one correspondence to user IDs of the conference terminals joining the data conference. That is, when joining the video conferences and the data conferences, the conference terminals use user IDs in one-to-one correspondence, thereby ensuring that the users joining the video conferences and the data conferences are the same. In some examples, for example, when one conference terminal uses a user name "AAA" to log in to a video conference, the conference terminal also uses the user name "AAA" to log in to a data conference, thereby ensuring uniform conference terminals for video conferences and data conferences.

At S102, a control instruction sent by a conference terminal is received, and all conference terminals are instructed, according to the control instruction, to switch to a video conference or data conference corresponding to the control instruction.

In the embodiment, the step of receiving a control instruction sent by a conference terminal, and instructing, according to the control instruction, all conference terminals to switch to a video conference or data conference corresponding to the control instruction includes: receiving a control instruction sent by a first conference terminal, and binding the first conference terminal to a conference token; and switching a state of the conference token according to the control instruction, and instructing, according to the state of the conference token, all conference terminals to switch to the corresponding video conference or data conference. The state of the conference token changes as the control instruction sent by the first conference terminal changes.

It is to be understood that the first conference terminal is a conference terminal selected according to a preset rule. The preset rule may be: assigning different permissions for conference terminals joining a conference, and determining a first conference terminal according to a high-low order of the permissions. For example, there are four conference terminals A, B, C and D. Conference terminal A has a higher permission than conference terminal B, and conference terminal B has a higher permission than conference terminal C and conference terminal D. When the conference terminals B, C and D exist in a current conference, the first conference terminal is the conference terminal B. When the conference terminals A, B, C and D exist in a current conference, the first conference terminal is the conference terminal A. The preset rule may also be: during a video conference, the terminal that issues a first control instruction for switching to display a data conference is the first conference terminal. For example, the terminals A, B, C, and D are holding a video conference in the current conference, and when the conference terminal C is the first terminal to send a control instruction to switch to the display of a data conference, the conference terminal C serves as the first conference terminal. It is to be understood that the preset rule is not limited to the above two manners herein and may also be flexibly set according to relevant designers.

In the embodiment, after a control instruction sent by a first conference terminal is received, the first conference terminal is bound to a conference token, and then a state of the conference token is changed according to the control instruction sent by the first conference terminal. The state of the conference token includes, but not limited to, an idle state, a whiteboard state, a transparent annotation state and a remote assistance state.

It is to be understood that a default state of the conference token is the idle state which indicates that no data conference is initiated in the current conference. When the state of the token is the idle state, the server instructs all participating conference terminals to display and output a video conference screen. For example, conference terminals join a conference, then require a state of a current token from a server. When the state of the token is an idle state, each conference terminal outputs and displays a video conference.

In the embodiment, the step of switching a state of the conference token according to the control instruction, and instructing, according to the state of the conference token, all conference terminals to switch to the corresponding video conference or data conference includes: switching the conference token to the whiteboard state according to the control instruction, and instructing, according to the whiteboard state of the conference token, all conference terminals to switch to a whiteboard data conference. For example, all conference terminals currently are outputting and displaying a video conference. Once an instruction of switching to a whiteboard state sent by the first conference terminal is received, the conference token is changed to the whiteboard state according to the control instruction. When the state of the conference token changes, the server sends a notification to all participating conference terminals to instruct all the conference terminals to switch to the whiteboard state.

In the embodiment, the step of switching a state of the conference token according to the control instruction, and instructing, according to the state of the conference token, all conference terminals to switch to the corresponding video conference or data conference includes: switching the conference token to the transparent annotation state according to the control instruction, and instructing, according to the transparent annotation state of the conference token, all conference terminals to switch to a transparent annotation data conference. For example, all conference terminals currently are outputting a whiteboard data conference. Once an instruction of switching to a transparent annotation state sent by the first conference terminal is received, the conference token is changed to the transparent annotation state according to the control instruction. When the state of the conference token changes, the server sends a notification to all participating conference terminals to instruct all the conference terminals to switch from the whiteboard data conference state to the transparent annotation state.

In the embodiment, the step of switching a state of the conference token according to the control instruction, and instructing, according to the state of the conference token, all conference terminals to switch to the corresponding video conference or data conference includes: switching the conference token to the remote assistance state according to the control instruction, and instructing, according to the remote assistance state of the conference token, all conference terminals to switch to a remote assistance data conference. For example, all conference terminals currently are outputting a whiteboard data conference. Once an instruction of switching to a remote assistance state sent by the first conference terminal is received, the conference token is changed to the remote assistance state according to the control instruction. When the state of the conference token changes, the server sends a notification to all participating conference terminals to instruct all the conference terminals to switch from the whiteboard data conference state to the remote assistance state.

In this embodiment, the step of switching a state of the conference token according to the control instruction, and instructing, according to the state of the conference token, all conference terminals to switch to the corresponding video conference or data conference includes: switching the conference token to the idle state according to the control instruction, and instructing, according to the idle state of the conference token, all conference terminals to switch to a video conference; and unbinding the first conference terminal from the conference token. When the the first conference terminal send a control instruction sent to switch the conference token to the idle state, a determination is made that the first conference terminal terminates the current data conference. When the state of the conference token is changed to the idle state, the server sends a notification to all participating conference terminals to instruct all the conference terminals to switch from any data conference state to a video conference state, and the first conference terminal is unbound from the conference token. At the same time, the identity of the first conference terminal is removed. For example, the conference terminal C is the first conference terminal and is bound to the conference token which is in a whiteboard state. When the conference terminal C sends a control instruction to switch the state of the conference token to an idle state, the server unbinds the first conference terminal from the conference token, and removes the identity of the conference terminal C as the first conference terminal, and at the same time, sends a notification to all participating conference terminals to instruct all conference terminals to switch from the whiteboard data conference state to a video conference state.

It is to be understood that in one conference, there is only one conference token, while there is only one first conference terminal at any time.

It is to be understood that, when a conference terminal joins a conference halfway, the conference terminal joining the conference halfway is required to retrieve a current state of the conference token and output and display a corresponding video conference or data conference according to the current state of the conference token. For example, when a conference terminal joins a conference halfway and identifies that the conference token is in an idle state, the conference terminal joining the conference halfway outputs and displays a video conference; or when the conference terminal identifies that the conference token is in a remote assistance state, the conference terminal joining the conference halfway outputs and displays a remote assistance data conference.

In the conference control method according to the embodiment of the present disclosure, video conferences and data conferences are created. The video conferences and the data conferences are in one-to-one correspondence. A control instruction sent by a conference terminal is received, and all conference terminals are instructed, according to the control instruction, to switch to a video conference or data conference corresponding to the control instruction. Thus, when the first conference terminal initiates or terminates discussion of a data conference in a specified mode, other terminals can automatically display or hide the data conference in the corresponding mode. In some examples, a conference token mechanism is introduced to control and manage conference terminals through the conference token. In this way, conference terminals joining a conference halfway can also be synchronized to the corresponding video or data conference, thereby improving user experience.

Embodiment Two

Figure 2:
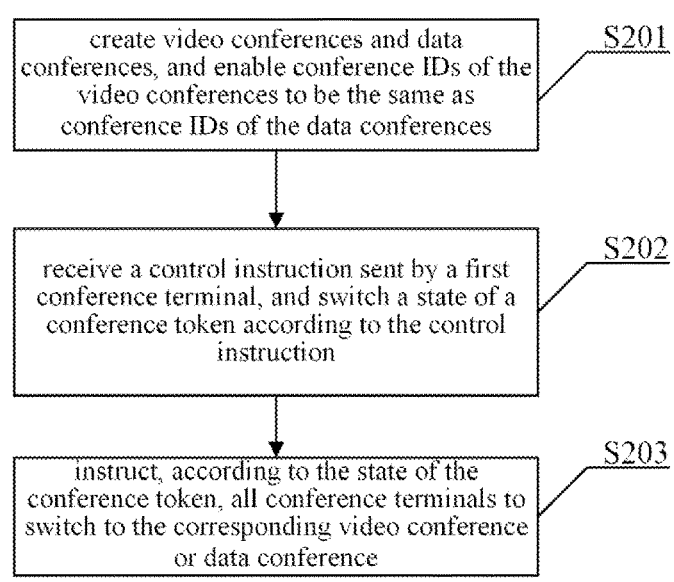
FIG. 2 is a basic schematic flowchart of another conference control method according to Embodiment two of the present disclosure.

To better understand the present disclosure, this embodiment provides an example to illustrate the conference control method. As shown in FIG. 2, the conference control method includes steps as follow.

At S201, a video conference and a data conference are created in such a way that the video conference has a same conference ID as the data conference.

In the embodiment, the conference ID of the data conference is created according to conference ID of the video conference, so that the conference ID of the video conference is the same as the conference ID of the data conference. For example, when a video conference with a conference ID of "123456" is created, a data conference is created utilizing the conference ID of the video conference, so that the data conference also has a conference ID of "123456", enabling the conference ID of the video conference to be the same as the conference ID of the data conference. It is to be understood that the conference ID of the video conference is the same as the conference ID of the data conference, so that conference terminals, when joining the video conference, can obtain the conference ID of the data conference according to the conference ID of the video conference joined, and then synchronously join the data conference corresponding to the video conference according to the obtained conference ID of the data conference. Alternatively, the conference terminals, when joining the data conference, can obtain the conference ID of the video conference according to the conference ID of the data conference, and then synchronously join the video conference corresponding to the data conference according to the obtained conference ID of the video conference.

It is to be understood that, in order to better facilitate a server to synchronously control clients joining the video conference and the data conference, conference terminals use the same user name to log in to the data conferences during video conference login authentication. That is, when joining the video conferences and the data conferences, the conference terminals use user IDs in one-to-one correspondence, thereby ensuring that users joining the video conferences and the data conferences are the same. For example, when one conference terminal uses a user name "AAA" to log in to a video conference, the conference terminal also uses the user name "AAA" to log in to a data conference, thereby ensuring uniform conference terminals for video conferences and data conferences.

At S202, a control instruction sent by a first conference terminal is received, and a state of a conference token is switched according to the control instruction.

It is to be understood that the first conference terminal is a conference terminal selected according to a preset rule. The preset rule may be: during a video conference, the first terminal that issues a first control instruction for switching to display a data conference is the first conference terminal. For example, terminals A, B, C, and D are holding a video conference in a current conference, and when the conference terminal C is the first terminal to send a control instruction to switch to the display of a data conference, the conference terminal C serves as the first conference terminal. It is to be understood that the preset rule is not limited to the above manner herein and may also be flexibly set according to relevant designers.

It is to be understood that there is one conference token in the server. The state of the conference token includes, but not limited to, an idle state, a whiteboard state, a transparent annotation state and a remote assistance state. A default state of the conference token is the idle state which indicates that no data conference is initiated in the current conference. That is, when the token is in the idle state, the server instructs all participating conference terminals to display a video conference output screen. For example, conference terminals join a conference, then require a state of a current token from a server. When the token is in an idle state, each conference terminal outputs and displays a video conference. It is to be understood that in a same conference, there is only one conference token, while there is only one first conference terminal at any time. When the first conference terminal is determined, the first conference terminal is bound to the conference token, so that the conference token switches the state only according to the control instruction of the first conference terminal.

In this embodiment, the switching a state of the conference token according to the control instruction includes, but not limited to any one of the following: when the conference token is not in a remote assistance state, switching the conference token to the remote assistance state according to the control instruction; when the conference token is not in a whiteboard state, switching the conference token to the whiteboard state according to the control instruction; when the conference token is not in a transparent annotation state, switching the conference token to the transparent annotation state according to the control instruction; and when the conference token is not in an idle state, switching the conference token to the idle state according to the control instruction.

At S203, all conference terminals are instructed, according to the state of the conference token, to switch to the corresponding video conference or data conference.

In the embodiment, the step of instructing, according to the state of the conference token, all conference terminals to switch to the corresponding video conference or data conference includes: instructing, according to the remote assistance state of the conference token, all conference terminals to switch to a remote assistance data conference. For example, all conference terminals currently are outputting a whiteboard data conference. Once an instruction of switching to a remote assistance state sent by the first conference terminal is received, the conference token is changed to the remote assistance state according to the control instruction. When the state of the conference token changes, the server sends a notification to all participating conference terminals to instruct all the conference terminals to switch from the whiteboard data conference state to the remote assistance state.

It is to be understood that, when the server switches the conference token to the idle state according to the control instruction and instructs, according to the idle state of the conference token, all conference terminals to switch to a video conference, the first conference terminal is unbound from the conference token at the same time. When the first conference terminal send the control instruction to switch the conference token to the idle state, a determination is made that the first conference terminal terminates the current data conference. When the state of the conference token is changed to the idle state, the server sends a notification to all participating conference terminals to instruct all the conference terminals to switch from any data conference state to a video conference state, and the first conference terminal is unbound from the conference token, and at the same time, the identity of the first conference terminal is removed. For example, the conference terminal C is the first conference terminal and is bound to the conference token, and the conference token is in a whiteboard state. When the conference terminal C sends a control instruction to switch the state of the conference token to an idle state, the server unbinds the first conference terminal from the conference token, and removes the identity of the first conference terminal of the conference terminal C, and at the same time, sends a notification to all participating conference terminals to instruct all conference terminals to switch from a whiteboard data conference state to a video conference state.

It is to be understood that, when a conference terminal joins a conference halfway, the conference terminal joining the conference halfway is required to retrieve a current state of the conference token and output and display a corresponding video conference or data conference according to the current state of the conference token. For example, when a conference terminal joins a conference halfway and identifies that the conference token is in an idle state, the conference terminal joining the conference halfway outputs and displays a video conference; or when the conference terminal identifies that the conference token is in a remote assistance state, the conference terminal joining the conference halfway outputs and displays a remote assistance data conference.

In the conference control method according to the embodiment of the present disclosure, video conferences and data conferences are created. The video conferences and the data conferences are in one-to-one correspondence. A control instruction sent by a conference terminal is received, and all conference terminals are instructed, according to the control instruction, to switch to a video conference or data conference corresponding to the control instruction. Thus, when the first conference terminal initiates or terminates discussion of a data conference in a specified mode, other terminals can automatically display or hide the data conference in the corresponding mode. In some examples, a conference token mechanism is introduced to control and manage conference terminals through the conference token. In this way, conference terminals joining a conference halfway can also be synchronized to the corresponding video or data conference, thereby improving user experience.

Embodiment Three

Figure 3:
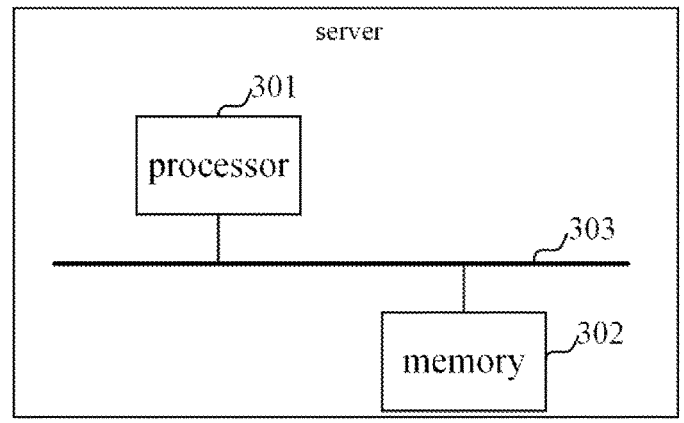
FIG. 3 is a basic schematic structural diagram of a server according to Embodiment three of the present disclosure.

This embodiment further provides a server, which, as shown in FIG. 3, includes a processor 301, a memory 302 and a communication bus 303.

The communication bus 303 is configured to realize connection communication between the processor 301 and the memory 302.

The processor 301 is configured to execute one or more programs stored in the memory 302 to carry out the conference control method in Embodiment one or Embodiment two.

This embodiment further provides a computer-readable storage medium which includes volatile and nonvolatile, removable and non-removable media implemented in any method or technology for storing information (such as computer-readable instructions, data structures, computer program modules, or other data). The computer-readable storage medium includes, but is not limited to, random access memory (RAM), read-only memory (ROM), electrically erasable programmable read-only memory (EEPROM), flash memory or other memory technologies, compact disc read-only memory (CD-ROM), digital versatile disk (DVD) or other optical storage, magnetic cassette, magnetic tape, magnetic disk storage or other magnetic storage apparatuses, or any other media that can be configured for storing desired information and can be accessed by a computer.

The computer-readable storage medium in this embodiment may be configured to store one or more computer programs which, when executed by a processor, cause the processor to carry out the conference control method in Embodiment one or Embodiment two.

The present disclosure has the following beneficial effects.

In the conference control method according to the embodiment of the present disclosure, video conferences and data conferences are created. The video conferences and the data conferences are in one-to-one correspondence. A control instruction sent by a conference terminal is received and all conference terminals are instructed, according to the control instruction, to switch to a video conference or data conference corresponding to the control instruction. According to some embodiments of the present disclosure, a server and a computer storage medium are further provided, which allow other terminals to automatically display or hide the data conference in the corresponding mode when the first conference terminal initiates or terminates discussion of a data conference in a specified mode.

As can be seen, it is to be understood by those having ordinary skills in the art that some or all steps of the method and function modules/units in the system or apparatus may be implemented as software (which may be implemented by computer program codes executable by a computing device), firmware, hardware and suitable combinations thereof. In the hardware implementation, the division of the function modules/units mentioned in the above description may not correspond to the division of physical components. For example, one physical component may have multiple functions, or one function or step may be performed jointly by several physical components. Some or all physical components may be implemented as software executed by a processor such as a central processing unit, a digital signal processor or a microprocessor, may be implemented as hardware, or may be implemented as integrated circuits such as application-specific integrated circuits.

Additionally, as is known to those having ordinary skills in the art, communication media generally include computer-readable instructions, data structures, computer program modules, or other data in carriers or in modulated data signals transmitted in other transmission mechanisms and may include any information delivery medium. Therefore, the present disclosure is not limited to any particular combination of hardware and software.

The above is a more detailed description of embodiments of the present disclosure in conjunction with specific implementations and is not to be construed as limiting the embodiments of the present disclosure. For those having ordinary skills in the art to which the present disclosure pertains, simple deductions or substitutions may be made without departing from the concept of the present disclosure and are considered to fall within the scope of the present disclosure.

What is claimed is:

1. A conference control method, comprising:
  creating video conferences and data conferences, both of which are in one-to-one correspondence; and
  receiving a control instruction sent by a first conference terminal selected from a plurality of conference terminals according to a preset rule to bind the first conference terminal to a conference token, wherein the preset rule includes assigning different permissions for each of the plurality of conference terminals joining the video conference or data conference;
  determining the first conference terminal as the controlling terminal of the video conference and data conference according to a high-low order of the assigned permissions;
  switching a state of the conference token according to the control instruction; and
  instructing, according to the state of the conference token, all conference terminals to switch to a video conference or data conference corresponding to the control instruction.

2. The conference control method of claim 1, wherein the step of creating video conferences and data conferences, both of which are in one-to-one correspondence comprises:
creating the video conferences, and creating the data conferences according to the created video conferences, so that conference IDs of the video conferences are in one-to-one correspondence to conference IDs of the data conferences.

3. The conference control method of claim 1, wherein the state of the conference token comprises any one of the following: an idle state, a whiteboard state, a transparent annotation state and a remote assistance state.

4. The conference control method of claim 3, wherein the step of switching a state of the conference token according to the control instruction, and instructing, according to the state of the conference token, all conference terminals to switch to the corresponding video conference or data conference comprises:
switching the conference token to the idle state according to the control instruction, and instructing, according to the idle state of the conference token, all conference terminals to switch to a video conference; and
unbinding the first conference terminal from the conference token.

5. The conference control method of claim 3, wherein the step of switching a state of the conference token according to the control instruction, and instructing, according to the state of the conference token, all conference terminals to switch to the corresponding video conference or data conference comprises:
switching the conference token to the whiteboard state according to the control instruction, and instructing, according to the whiteboard state of the conference token, all conference terminals to switch to a whiteboard data conference.

6. The conference control method of claim 3, wherein the step of switching a state of the conference token according to the control instruction, and instructing, according to the state of the conference token, all conference terminals to switch to the corresponding video conference or data conference comprises: switching the conference token to the transparent annotation state according to the control instruction, and instructing, according to the transparent annotation state of the conference token, all conference terminals to switch to a transparent annotation data conference.

7. The conference control method of claim 3, wherein the step of switching a state of the conference token according to the control instruction, and instructing, according to the state of the conference token, all conference terminals to switch to the corresponding video conference or data conference comprises:
switching the conference token to the remote assistance state according to the control instruction, and instructing, according to the remote assistance state of the conference token, all conference terminals to switch to a remote assistance data conference.

8. A server, comprising a processor, a memory and a communication bus; wherein
the communication bus is configured to realize connection communication between the processor and the memory; and
the processor is configured to execute at least one program stored in the memory to perform a method comprising:
creating video conferences and data conferences, both of which are in one-to-one correspondence;
receiving a control instruction sent by a first conference terminal selected from a plurality of conference terminals according to a preset rule to bind the first conference terminal to a conference token, wherein the preset rule includes assigning different permissions for each of the plurality of conference terminals joining the video conference or data conference;
determining the first conference terminal as the controlling terminal of the video conference and data conference according to a high-low order of the assigned permissions;
switching a state of the conference token according to the control instruction; and
instructing, according to the state of the conference token, all conference terminals to switch to a video conference or data conference corresponding to the control instruction.

9. A non-transitory computer-readable storage medium, storing at least one computer program, which when executed by at least one processor, cause the at least one processor to perform a method comprising:
creating video conferences and data conferences, both of which are in one-to-one correspondence; and
receiving a control instruction sent by a first conference terminal selected from a plurality of conference terminals according to a preset rule to bind the first conference terminal to a conference token, wherein the preset rule includes assigning different permissions for each of the plurality of conference terminals joining the video conference or data conference;
determining the first conference terminal as the controlling terminal of the video conference and data conference according to a high-low order of the assigned permissions;
switching a state of the conference token according to the control instruction; and
instructing, according to the control instructionstate of the conference token, all conference terminals to switch to a video conference or data conference corresponding to the control instruction.

10. The server of claim 8, wherein the step of creating video conferences and data conferences, both of which are in one-to-one correspondence comprises:
creating the video conferences, and creating the data conferences according to the created video conferences, so that conference IDs of the video conferences are in one-to-one correspondence to conference IDs of the data conferences.

11. The server of claim 8, wherein the state of the conference token comprises any one of the following: an idle state, a whiteboard state, a transparent annotation state and a remote assistance state.

12. The server of claim 11, wherein the step of switching a state of the conference token according to the control instruction, and instructing, according to the state of the conference token, all conference terminals to switch to the corresponding video conference or data conference comprises:
switching the conference token to the idle state according to the control instruction, and instructing, according to the idle state of the conference token, all conference terminals to switch to a video conference; and
unbinding the first conference terminal from the conference token.

13. The non-transitory computer-readable storage medium of claim 9, wherein the step of creating video conferences and data conferences, both of which are in one-to-one correspondence comprises:

creating the video conferences, and creating the data conferences according to the created video conferences, so that conference IDs of the video conferences are in one-to-one correspondence to conference IDs of the data conferences.

14. The non-transitory computer-readable storage medium of claim 9, wherein the state of the conference token comprises any one of the following:

an idle state, a whiteboard state, a transparent annotation state and a remote assistance state.

* * * * *